United States Patent [19]

Yelton et al.

[11] Patent Number: 4,921,308
[45] Date of Patent: May 1, 1990

[54] MOBILE MACHINE SUSPENSION SYSTEM

[75] Inventors: Darrell A. Yelton, Lee's Summit, Mo.; Richard S. Norland, Stilwell, Kans.

[73] Assignee: Target Products Inc., Kansas City, Mo.

[21] Appl. No.: 186,049

[22] Filed: Apr. 25, 1988

[51] Int. Cl.$^5$ ............................................. E01C 23/09
[52] U.S. Cl. ....................................... 299/39; 125/14; 280/723; 280/724
[58] Field of Search .................... 299/36, 39; 404/90; 125/14; 280/47.21, 47.22, 723, 724, DIG. 1

[56] References Cited

U.S. PATENT DOCUMENTS

| | | |
|---|---|---|
| 2,939,691 | 6/1960 | Lewis .................................... 299/39 |
| 2,973,950 | 3/1961 | Tucker .................................. 299/39 |
| 3,141,702 | 7/1964 | Barton .................................. 299/39 |
| 3,464,737 | 9/1969 | Haase et al. ......................... 299/39 |
| 3,989,304 | 11/1976 | Wirtgen ............................... 299/39 |

FOREIGN PATENT DOCUMENTS 781252 12/1980 U.S.S.R. ............................... 299/39

Primary Examiner—Stephen J. Novosad
Assistant Examiner—David J. Bagnell
Attorney, Agent, or Firm—Robert F. Hess

[57] ABSTRACT

An improved suspension system for a mobile machine adapted to work a material associated with a horizontal surface includes a frame mounting a prime mover. An arbor shaft extends transversely across the frame adjacent to a front end of the machine and is drivingly connected to the prime mover. The suspension system includes a live rear axle and a front axle assembly that is extendable and retractable whereby the machine is movable between raised and lowered positions. A rotating tool is mounted on the arbor shaft. Lowering the machine from its raised position engages the tool with the material. The improvement to the suspension system comprises a support device for providing extra support to the frame when the machine is in its lowered position, the support device being adapted to stabilize the machine when the tool exerts an upward reactionary force on the machine front end.

21 Claims, 4 Drawing Sheets

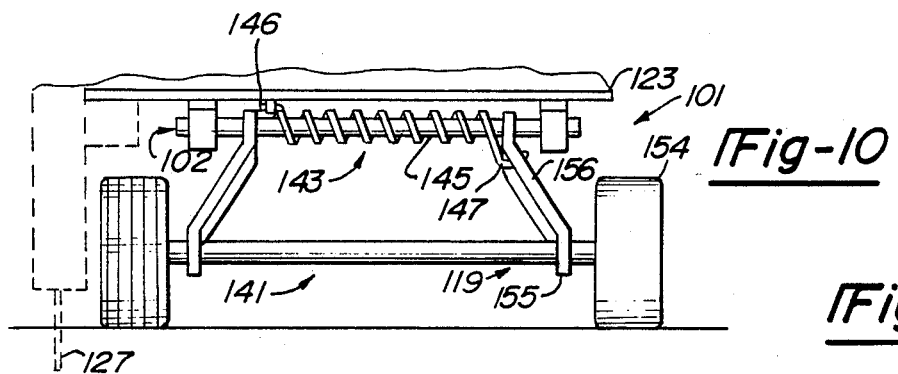
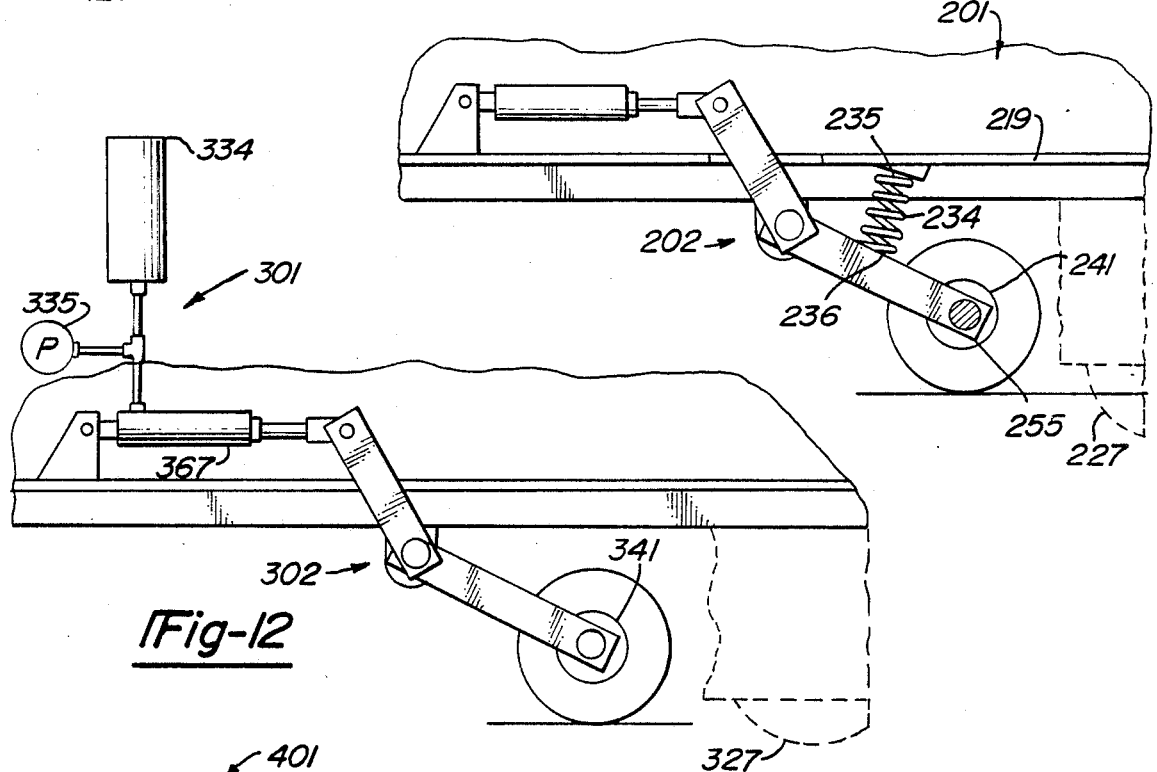
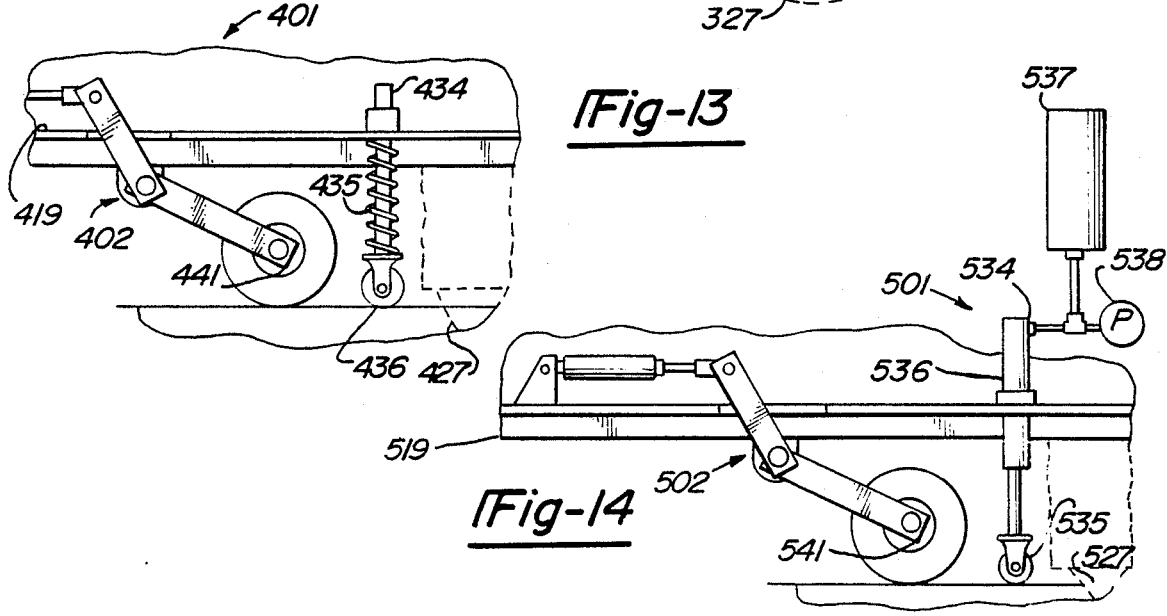

MOBILE MACHINE SUSPENSION SYSTEM

BACKGROUND OF THE INVENTION

1. Field of the Invention.

The present invention relates generally to suspension systems, and in particular to a suspension system for stabilizing a slab saw.

2. Description of the Prior Art.

A variety of different types of suspension systems have heretofore been devised to meet the requirements of various vehicles and mobile equipment. The primary purpose of a suspension system is to transfer the weight of a particular vehicle or piece of mobile equipment to a surface upon which it is supported. Important considerations for an effective suspension system include stability, vibration damping and adaptability to various service conditions.

Specific tasks in the construction, maintenance and demolition industries are often accomplished with specially designed vehicles and mobile equipment. For example, self-propelled slab saws are commonly used for sawing horizontal slabs of concrete, asphalt and similar materials. A typical self-propelled slab saw includes a chassis mounting a prime mover, a circular saw blade mounted on a transverse arbor shaft at the front end and a suspension system. Such a slab saw or concrete sawing machine is disclosed in the Tucker U.S. Pat. No. 2,973,950, and includes a suspension system with a pair of rear stabilizing wheels that are raised and lowered by a hydraulic cylinder.

A common type of suspension system for a self-propelled slab saw includes a pair of driven rear wheels mounted on a live axle and a pair of extendable and retractable front wheels. An operator walks behind the machine and guides it with a pair of handles. Extending the front wheels raises the front of the machine so that its blade can be positioned over a slab surface. As the front wheels are retracted, the blade lowers into the slab. By adjusting the extension of the front wheels, the depth of cut can be controlled.

Slab saws are presently available for cutting concrete slabs to depths of three feet. As the saw advances, the front edge of the circular blade removes slab material in the saw kerf. In a downcut mode, which is generally preferred, the saw blade rotates in the same direction as the wheels whereby the blade cuts downwardly into the slab material. The resistance of the slab material produces an upward reactionary force on the saw blade at the front of the machine. This upward, reactionary force tends to unload the retracted vehicle front wheels whereby the saw is substantially supported on the three points of a triangle defined by the rear wheels and the saw blade. As long as the center of gravity of the machine is located directly over this triangle, the saw will tend to remain fairly stable. However, if the saw's center of gravity shifts to a position where it is outside of the rear wheels/blade triangle, the machine can become unstable. When the saw becomes unstable, the operator may experience difficulty in following a straight cut line, and the blade may wobble or bind. Such conditions tend to greatly increase blade wear and can lead to blade failure.

The parameters that control the operation of a slab saw include the reactionary force associated with the resistance of the material being cut, the depth of cut, the torque applied to the saw blade, the forward travel speed of the saw, the weight of the saw and the location of the saw's center of gravity. A typical slab saw is designed to travel on all four wheels with the center of gravity located over a rectangle defined thereby. However, the saw blade torque is often sufficient to produce an upward reactionary force through the blade and arbor shaft that unloads the front wheels whereby the aforementioned operating parameters become unbalanced. In this condition the saw is substantially supported on three points defined by the two rear wheels and the blade. This three point support makes it difficult to maintain a constant depth of cut and a uniform forward travel speed, because the upward reactionary force of the saw blade is sufficient to raise the blade and front end of the saw thereby resulting in a shallower cut. The normal operator response to this condition is to reduce travel speed, which reduces the upward reactionary force and permits the saw blade to cut at a desired depth. However, reducing the travel speed is undesirable because of the corresponding reduction in efficiency and machine capacity utilization.

Unloading the front wheels of the saw can render it unstable if its center of gravity is located outside of the triangle defined by the rear wheels and saw blade. In this condition the saw will tend to tip diagonally towards its unsupported front corner transversely opposite the blade. Upon sensing this condition, the operator can reduce speed and thus reload or increase the load on the front wheels. However, the condition of instability, even if only encountered intermittently, can cause premature blade failure, reduced cutting performance and/or stalling of the prime mover and the blade. A particularly serious consequence is that the blade can actually rise from its kerf and skip across the pavement, or the entire saw may tip over.

A previous solution was to concentrate as much weight as far rearwardly as possible. For example, ballast could be added to the rear of the saw, but the added weight made the saw more cumbersome and difficult to operate. Designers of previous slab saws have been somewhat limited by the aforementioned center of gravity parameters, which often dictated the location of major components like the engine.

Another solution to the blade reactionary force problem is to increase the length of the transverse arbor shaft upon which the saw blade is mounted to increase the area of the rear wheels/blade support triangle. A greater stabilizing reactionary moment can thus be created to counter the moment produced by the reactionary force of the saw blade. However, this solution requires an increase in the overall width of the saw, which makes access to certain work areas more difficult. For example, slab saws are often used inside existing structures and must pass through existing doorways. Thus, to accomodate such field conditions slab saw width is normally limited whereby it is not practical to solve the aforementioned stability problems by increasing the arbor shaft length.

The present invention addresses the aforementioned problems.

SUMMARY OF THE INVENTION

In the practice of the present invention, an improved suspension system is provided for a machine for working a material associated with a horizontal surface. The machine includes front and back ends, opposite sides and a frame mounting a prime mover. A transverse arbor shaft is mounted on the frame in proximity to its front end and is adapted for mounting a rotary tool, such as a saw blade. A suspension system is mounted on the frame and includes a live rear axle drivingly connected to the prime mover and a front axle assembly. The front axle assembly is extendable and retractable whereby the machine is adapted to be raised and lowered. The improvement to the suspension system comprises a support device for providing added support to the frame when the vehicle is in its lowered position to counteract an upward, reactionary force caused by the rotating tool interacting with the material being worked. In a preferred embodiment the support device comprises a torsional assembly including a torsion bar mounting a torsion arm adapted to engage the axle assembly and bias it downwardly. The effect of biasing the axle assembly downwardly is similar to the effect of moving the machine center of gravity rearwardly whereby the machine is stabilized when an upward, reactionary force associated with the tool is encountered.

OBJECTS OF THE INVENTION

The principal objects of the present invention are: to provide an improved suspension system for a machine for working a material associated with a horizontal surface; to provide such an improved suspension system which enhances stability of the machine; to provide such an improved suspension system which adds relatively little weight to the machine; to provide such an improved suspension system which does not render the machine more cumbersome or difficult to handle; to provide such an improved suspension system which does not add to the width of the machine; to provide such an improved suspension system which tends to stabilize the machine; to provide such an improved suspension system which tends to stabilize the machine in response to an upward, reactionary force on a tool associated with a front end of the machine; to provide such an improved suspension system which allows the machine to maintain a greater forward operating speed; to provide such an improved suspension system which tends to reduce wear associated with a saw blade mounted on the machine; to provide such an improved suspension system which is adapted for reducing the likelihood that the blade will bind; to provide such an improved suspension system which tends to reduce the likelihood that the prime mover of the machine will stall; to provide such an improved suspension system which contributes to operator safety; and to provide such an improved suspension system which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 8 is an enlarged, fragmentary, vertical cross-sectional view of the torsional assembly taken generally along line 8—8 in FIG. 7.

FIG. 11 is a fragmentary, vertical cross-sectional view of a slab saw suspension system comprising a second modified embodiment of the present invention.

FIG. 12 is a fragmentary, vertical cross-sectional view of a slab saw suspension system comprising a third modified embodiment of the present invention.

FIG. 13 is a fragmentary, vertical cross-sectional view of a slab saw suspension system comprising a fourth modified embodiment of the present invention.

FIG. 14 is a fragmentary, vertical cross-sectional view of a slab saw suspension system comprising a fifth modified embodiment of the present invention.

DETAILED DESCRIPTION OF THE PREFERRED EMBODIMENTS

I. Introduction and Environment

Figure 1:
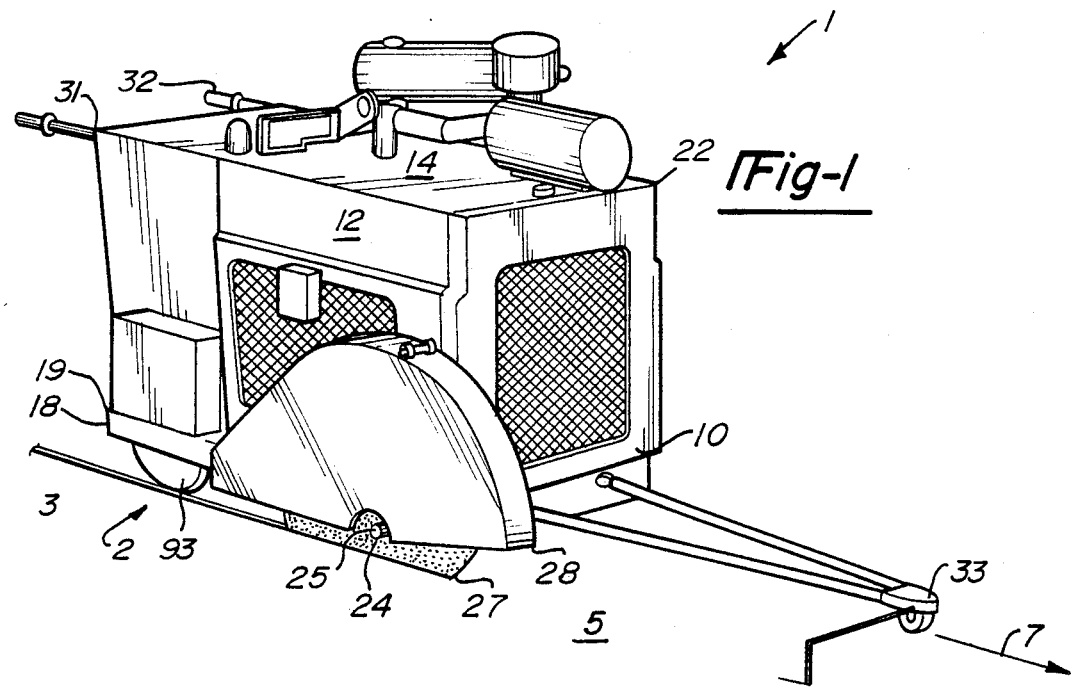
FIG. 1 is a front, top, right perspective view of a slab saw with an improved suspension system embodying the present invention.

It is to be understood that the following disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a mobile machine comprising a self-propelled slab saw with a suspension system 2 embodying the present invention. The slab saw 1 is adapted for making a cut 3 in a slab 4 having an upper surface 5. Without limitation on the generality of useful applications of the slab saw 1, the slab 4 may comprise, for example, concrete or asphalt pavement. The slab saw 1 might be used, for example, for cutting up the slab 4 in preparation for its removal, for making a utility cut in the slab 4, or for cutting expansion joints in the slab 4.

The slab saw 1 has a forward direction of travel indicated by the arrow 7; and front, rear, right side and left side directional orientations are taken with respect thereto. However, such exemplary directional orientations are not to be interpreted as limiting, except as such limitations appear in the claims.

II. Slab Saw

The slab saw 1 may comprise, for example, a heavy duty highway saw which is commercially available under the trademark "800 MCA-Roadrunner" from the Felker Operations Division of Federal-Mogul Corporation in Torrance, Calif. However, the suspension system 2 of the present invention may be utilized on various other types of equipment, especially equipment designed for cutting, planing, abrading and resurfacing pavement.

The slab saw 1 has front and back ends 10, 11; opposite right and left sides 12, 13; a top 14 and a bottom 15. At the slab saw bottom 15 the chassis 18 includes a frame 19 with a deck 23. The frame 19 mounts a drive train 20 including a prime mover 21, e.g., a water-cooled, 80 horsepower, 2.5 liter Chrysler industrial engine, mounted on a center portion of the frame 19 in an engine compartment 22.

The drive train 20 is drivingly connected to an arbor shaft 24 which extends transversely in proximity to the chassis front end 10 just below the frame 19. The arbor shaft 24 includes opposite right and left ends 25, 26 associated with the vehicle sides 12, 13. A circular saw blade 27 can be mounted on either arbor shaft end 25 or 26, but normally only one blade would be mounted on the arbor shaft 24. A protective blade guard 28 partially encloses an upper portion of the saw blade 27 in use. The saw blade 27 is preferably selected to provide suitable cutting characteristics in the slab 4 to be cut. At the slab saw back end 11 a control and drive compartment 31 is provided. The slab saw 1 is guided with a pair of handles 32 extending rearwardly from the control and drive compartment 31 for grasping by an operator walking behind the slab saw 1. A front guide wheel assembly 33 extends forwardly from the slab saw front end 10 and provides the operator with a reference for guiding the slab saw 1 along a premarked cut line.

III. Suspension System

The chassis 18 also includes the suspension system 2, which generally comprises a front axle assembly 41, a front axle actuating assembly 42, a front axle biasing or torsional assembly 43 and a rear axle assembly 44.

The front axle assembly 41 comprises a rocker bar 47 with opposite right and left ends 48, 49 respectively journaled in right and left rocker bar bearing blocks 50, 51 mounted on the chassis frame 19 below the deck 23. A front axle 52 with opposite right and left ends 61, 62 mounting front wheels 54 is rigidly connected to the rocker bar 47 in parallel relation therewith by a front axle subframe 55 with front and back ends 59, 60. The front axle subframe 55 includes a pair of side arms 56 and a middle arm 57 extending in parallel relation between the rocker bar 47 and the front axle 52. The front axle subframe 55 also includes a pair of diagonal members 58, each of which extends between a respective side arm 56 and the middle arm 57, and between the rocker bar 47 and the front axle 52. The front axle subframe 55 preferably provides a rigid innerconnection between the rocker bar 47 at its back end 59 and the front axle 52 at its front end 60.

The actuating assembly 42 includes a pair of actuating levers 63 protruding through an opening 66 in the deck 23 with proximate and distal ends 64, 65, the proximate ends 64 being fixedly attached to the rocker bar 47 below the deck 23 and the distal end 65 being located above the deck 23. A hydraulic piston-and-cylinder unit 67 includes a cylinder end 68 mounted on the chassis frame 19 above the deck 23 and a piston end 69 pivotally connected to the actuating lever distal ends 65. With the piston-and-cylinder unit 67 located behind the rocker bar 47, extending it causes the front axle assembly 41 to extend whereby the front axle 52 is lowered with respect to the chassis frame 19. Conversely, retraction of the piston-and-cylinder unit 67 retracts the front axle assembly 41 whereby the front axle 52 is raised with respect to the chassis frame 19.

In a preferred embodiment of the present invention, the torsional assembly 43 functions as a support device and comprises a torsion bar 71 with opposite right and left ends 72, 73 respectively journaled in right and left bearing blocks 74, 75 mounted on the chassis frame 19 below the deck 23 by bolts 79. Suitable mounting locations for the torsion bar bearing blocks 74, 75 are just in front of and outside of the rocker bar bearing blocks 50, 51.

The torsion bar left end 73 is freely rotatable in the left bearing block 75, but the torsion bar right end 72 is locked against rotation within the right bearing block 74 by a key 76 received in a longitudinal slot 77 in the torsion bar right end 72 and in a keyway 78 in the right bearing block 74. A torsion arm 80 includes a proximate end 81 mounting a sleeve 82 with a transversely-extending receiver 83 for the torsion bar 71. The torsion arm proximate end 81 is locked against rotation with respect to the torsion bar left end 73 by a key 84 received in a torsion bar slot 85 and a keyway 86 in the sleeve 82. The torsion arm 80 terminates at a distal end 89 which is positioned above the front axle 52 for selective engagement therewith.

The rear axle assembly 44 includes a live rear axle 91 driven by the prime mover 21 through the drive train 20. The rear axle 91 extends transversely with respect to the chassis 18 in proximity to the saw back end 11. The rear axle 91 has opposite ends 92 mounting rear drive wheels 93.

IV. Operation

Figure 3:
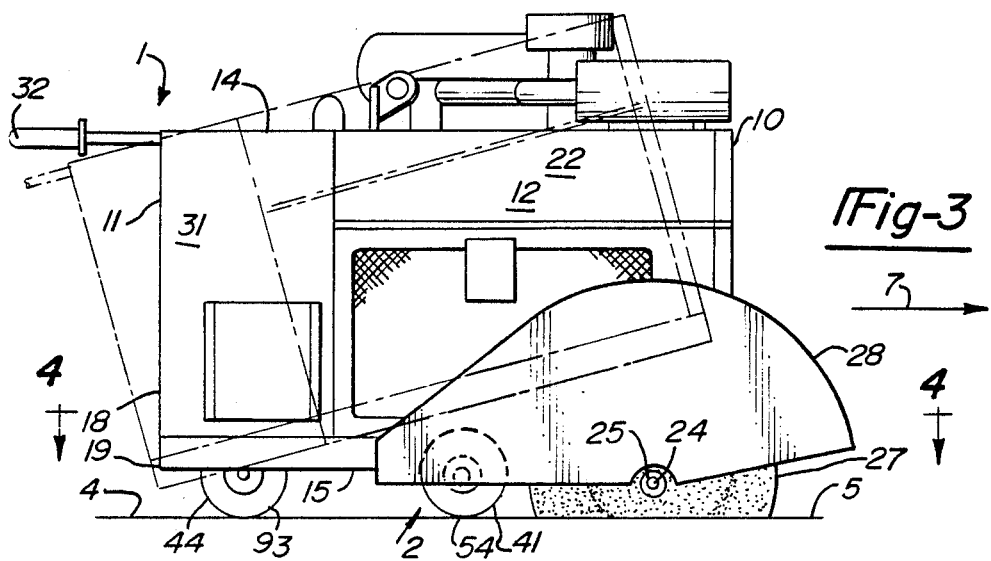
FIG. 3 is a side elevational view of the slab saw shown in its fully lowered position in solid lines and in its fully raised position in phantom lines.
Figure 4:
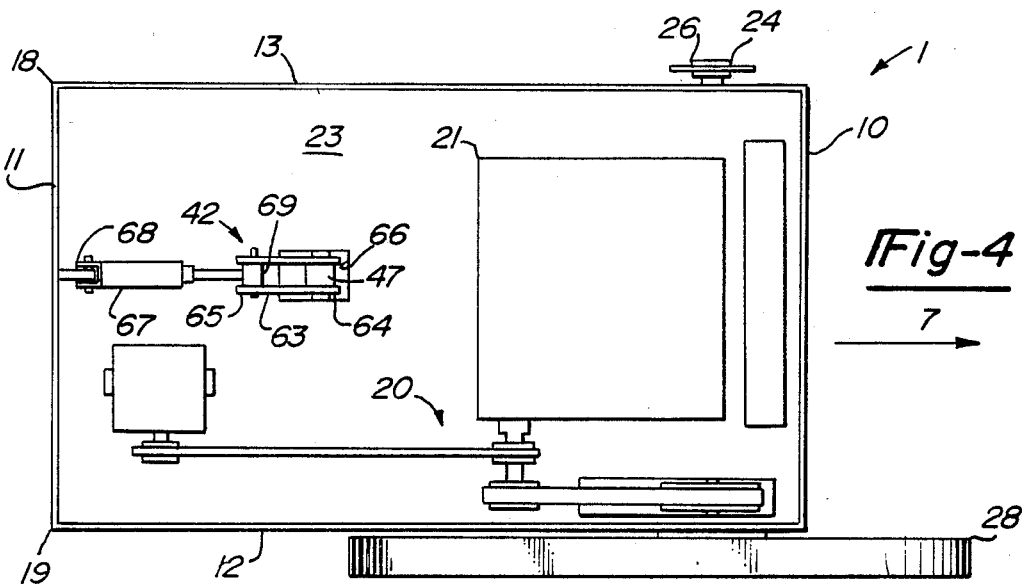
FIG. 4 is a horizontal, cross-sectional view of the slab saw taken generally along line 4—4 in FIG. 3.
Figure 5:
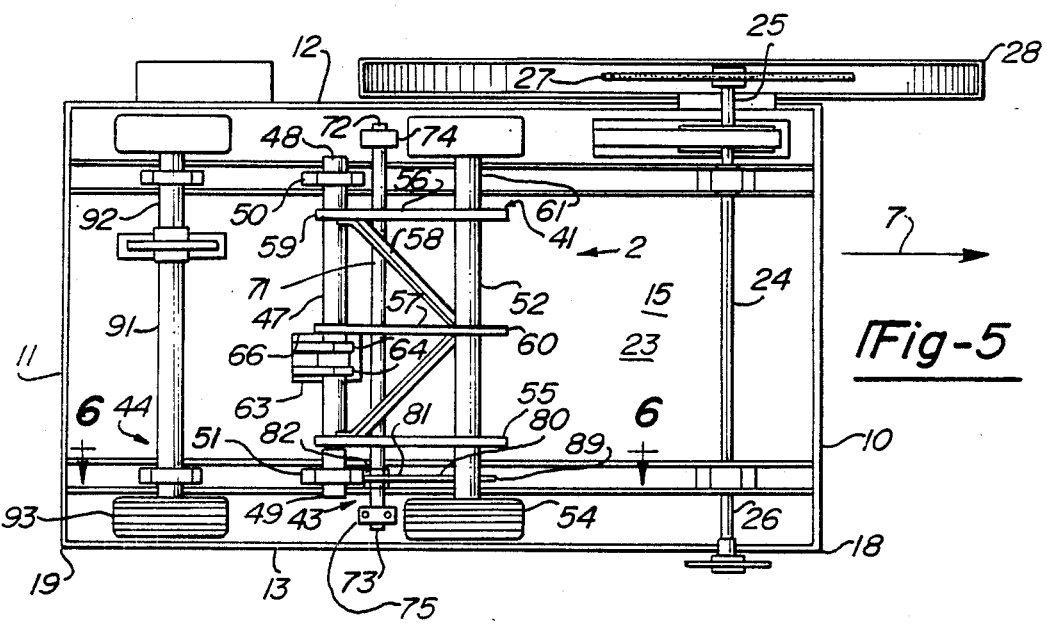
FIG. 5 is a bottom plan view of the slab saw.

In operation, the saw 1 is movable between a fully raised, disengaged position (FIG. 3, phantom lines) with the front axle assembly 41 fully extended and a fully lowered, cutting position (FIG. 3, solid lines) with the front axle assembly 41 fully retracted. The depth of the cut 3 is determined by the position of the saw 1 between its fully raised and fully lowered positions. Preferably the piston-and-cylinder unit 67 will allow the positioning of the saw 1 at a full range of intermediate positions to achieve saw cuts of various depths.

Figure 2:
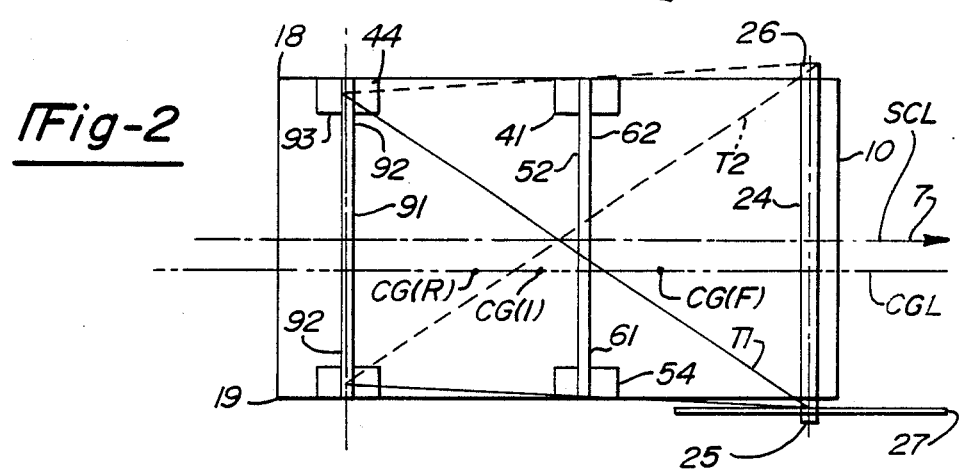
FIG. 2 is a schematic top plan view of the slab saw illustrating a triangular stability zone and the effective locations of the center of gravity under various operating conditions.

With the saw 1 fully raised (FIG. 3, phantom lines), the center of gravity CG(R) is located in its rearmost position (FIG. 2). With the saw 1 fully lowered (FIG. 3, solid lines), the center of gravity CG(F) is in its forwardmost position. Since the lowermost saw position also corresponds to the greatest cutting depth, the greatest potential for instability occurs in this configuration. Since the saw blade 27 is at maximum insertion in this position, the maximum upward reaction force will be encountered for a given travel speed. The upward reaction force of the saw blade 27 with the concrete can unload the front wheels 54, whereby the saw 1 is substantially supported on the saw blade 27 and the rear wheels 93, which define a triangular area T1. However, the forwardmost center of gravity CG(F) is likely to be located outside of T1 with the saw 1 fully lowered, whereby the saw 1 is potentially unstable and will have a tendency to tip towards the front left corner, which does not include and is transversely opposite to the saw blade 27 (FIG. 2).

The center of gravity CG is thus movable along a horizontal line CGL extending fore and aft with respect to the saw 1, depending upon the raised or lowered position of the saw 1. Normally the line CGL will be positioned on one side or the other of the longitudinal center line SCL of the saw 1 because engine placement and similar factors generally make the saw 1 heavier on one side or the other. The saw blade 27 is preferably mounted on the heavier side (i.e., arbor shaft right end 25) for normal operation, because when a saw blade/rear wheel support condition is encountered, the center of gravity is more likely to be located in or near the stability triangle T1 if the saw blade 27 is on the heavy side of the saw 1. This concept is graphically shown in FIG. 2, which shows triangle T1 including as its front point the saw blade 27 and as its rear points the rear wheels 93. Since the center of gravity line CGL is to the right of the saw longitudinal center line SCL, only a relatively small portion of the center of gravity line CGL is outside the perimeter of triangle T1.

Triangle T2 (FIG. 2) illustrates the blade/rear wheels support condition for the blade 27 mounted on the left end 26 of the arbor shaft 24. A significantly greater portion of the center of gravity line CGL is located outside the perimeter of T2 than is located outside the perimeter of T1, which illustrates the stability advantage of locating the saw blade 27 on the heavy side of the saw 1.

The torsion arm distal end 89 is preferably positioned so that it engages the left end 62 of the front axle 52 at a contact area 95 when the saw 1 is at a predetermined position (FIG. 6b) between fully raised and fully lowered. The position at which contact should occur depends upon the stiffness of the torsion bar 71, the weight of the saw 1, the depth of the cut 3 and similar factors which, taken together, determine the amount of force desired from the torsional assembly 43 at different positions of the saw 1.

With the torsion arm distal end 89 engaging the front axle 52, the torsion bar 71 is twisted (counterclockwise when viewed from the right as in FIGS. 6a-d) by further lowering the saw 1. The torsion bar 71 reacts with a torque force transmitted through the torsion arm 80 to the front axle 52, which torque force tends to extend the front axle assembly 41. When the aforementioned blade/rear wheels support condition is encountered and the front wheels 54 are unloaded, the torsion assembly 43 will function to force the front wheels 54 into engagement with the slab surface 5 whereby stability is maintained. Since the torsion arm 80 at its distal end 89 exerts a downward force on the front axle 52, at its proximate end 81 the torsion arm 80 exerts an upward force through the torsion bar left end 73, through the left bearing block 75 and to the frame 19. The upward component of this force tends to support the saw front end 10 and the saw left side 13, and tends to resist a tendency of the saw 1 to tip towards its front left corner when the front wheels 54 are unloaded.

The torsional assembly 43, by applying a downwardly directed force to the front wheels 54, has an effect on saw stability analogous to relocating the center of gravity CG(I) rearwardly to a position on line CGL intermediate CG(F) and CG(R). This could also be accomplished by placing additional weight on the right rear corner of the saw 1, but the additional weight would make the saw 1 more cumbersome and difficult to operate. The torsional assembly 43, on the other hand, adds very little weight to the saw 1 and significantly enhances its stability, particularly when a blade/rear wheels support condition is encountered.

Figure 7:
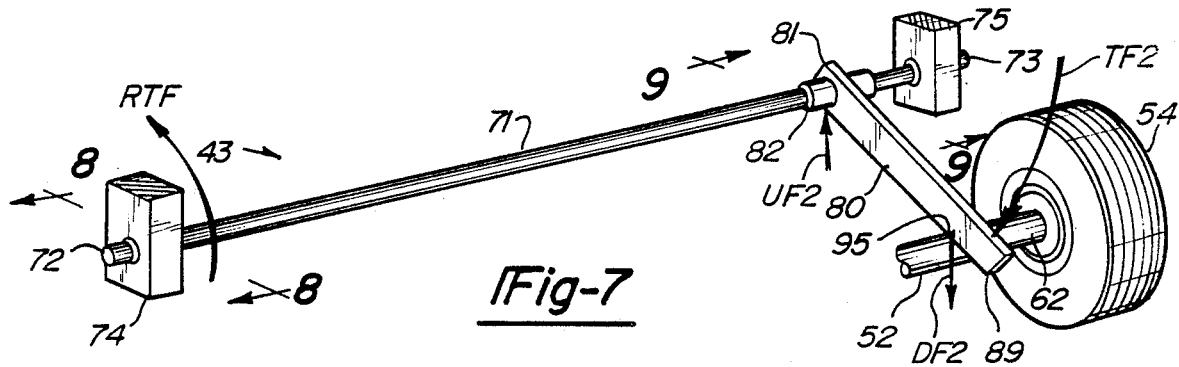
FIG. 7 is an enlarged, fragmentary, front, top, right perspective view of the slab saw, particularly showing a torsional assembly of the suspension system thereof.

In addition to the aforementioned upward and downward forces exerted through the torsion arm 80, a reactionary torque force RTF is applied to the frame 19 through the torsion bar 71 and the right torsion bar bearing block 74 fixedly attached thereto (FIG. 7). This reactionary torque force RTF also improves saw stability by supporting the saw front end 10, much like the effect that would be achieved by placing additional weight on the right rear corner of the saw 1.

The stabilizing effect of the torsional assembly 43 is automatically variable and generally proportional with the position of the saw 1 between its fully lowered and its fully raised positions. The torsion bar 71 is arranged so that a greater downward force is applied to the front axle 52 as the depth of cut and accompanying reactionary force increase. In FIG. 6a the saw 1 is fully raised and the torsion arm 80 is disengaged from the front axle 52. The torsion bar 71 is not twisted, hence the torsion arm exerts no force on either the frame 19 or the front axle 52. The torsion arm 80 defines an acute angle A1 with respect to the frame 19.

Figure 6B:
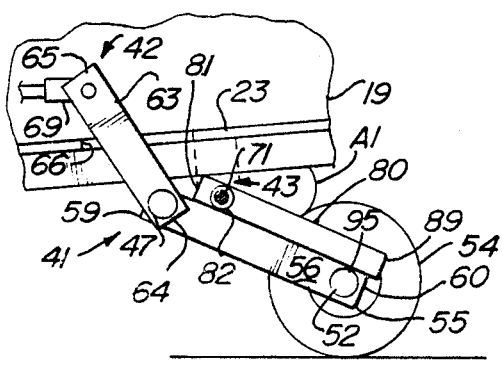
FIG. 6b is an enlarged, fragmentary vertical cross-sectional view of the slab saw taken generally along line 6—6 in FIG. 5 and showing the slab saw partially lowered.
Figure 6A:
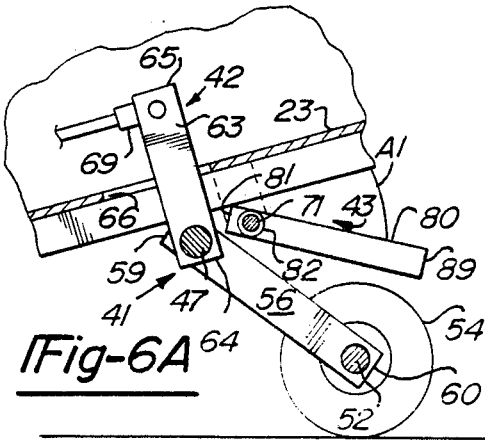
FIG. 6a is a fragmentary, vertical cross-sectional view of the slab saw, taken generally along line 6—6 in FIG. 5 and showing the slab saw in its fully raised position.

FIG. 6b shows the saw 1 in a configuration at the moment of contact between the torsion arm 80 and the front axle 52 at the contact area 95. As in the condition shown in FIG. 6a, the torsion bar 71 is not twisted and no force is exerted through the torsion arm 80. The torsion arm 80 defines an acute angle A1 with respect to the frame 19.

Figure 6C:
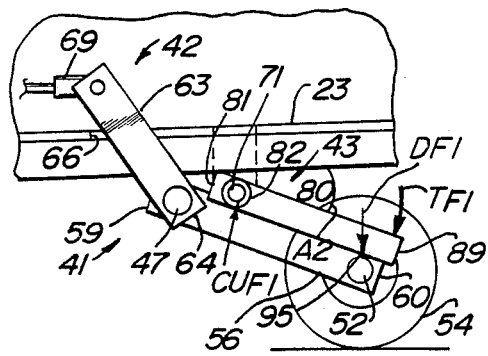
FIG. 6c is an enlarged, fragmentary, vertical cross-sectional view of the slab saw taken generally along line 6—6 in FIG. 5 and particularly showing the slab saw in a position slightly lowered from that shown in FIG. 6b.

FIG. 6c shows the saw 1 in an intermediate lowered position whereat the weight of the saw 1 has moderately twisted the torsion bar 71 in a counterclockwise direction (when viewed from the right as in FIG. 6c), whereby the torsion bar 71 reacts with a moderate clockwise torque force indicated by the arcuate arrow TF1. The torque force TF1 causes a moderate upward force UF1 on the frame 19 through the right torsion bar bearing block 74. The moderate torque force TF1 also causes a moderate downward force DF1 on the front axle left end 62 via the torsion arm distal end 89. A moderate support would thus be provided to the front left corner of the saw 1. In this configuration a moderate amount of support is appropriate because the saw blade 27 would not be fully embedded in the slab 4 and thus would probably produce only moderate upward reactionary force. The torsion arm 80 defines an acute angle A2, which is narrower than acute angle A1, with respect to the frame 19.

Figure 6D:
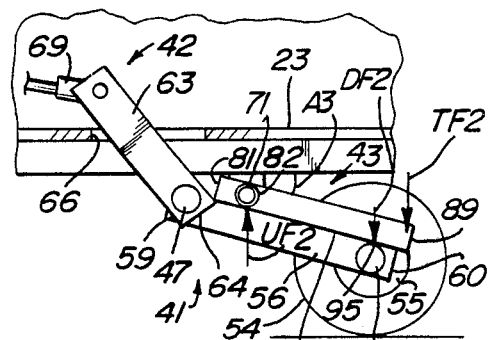
FIG. 6d is an enlarged, fragmentary, vertical cross-sectional view of the slab saw taken generally along line 6—6 in FIG. 5 and particularly showing the slab saw in its fully lowered position.

FIGS. 6d and 7 show the saw 1 in a fully lowered configuration. The torsion bar is twisted counterclockwise to the maximum degree of rotation permitted by the design parameters, and reacts with a maximum clockwise torque force TF2. The upward and downward force components UF2 and DF2 exerted through the torsion arm proximate and distal ends 81, 89 respectively are at their corresponding maximum magnitudes. Hence, in this condition maximum support is provided to the front left corner of the saw 1. With the saw 1 in its fully lowered condition, the blade 27 is fully embedded in the slab 4 and maximum upward reactionary force therefrom can be expected. The torsion arm 80 defines an acute angle A3, which is narrower than the acute angle A2, with respect to the frame 19.

This variable force feature of the torsional assembly 43 is highly desirable since the greatest upward reaction force on the saw blade 27 is encountered when the saw 1 is in its fully lowered position for maximum cut depth. Thus, the torsion bar 71 cooperates with the raising and lowering function of the saw 1 to provide appropriate stability throughout the range of operating conditions. The torsional assembly 43, by contributing to the stability of the saw 1, enables operation at a relatively uniform forward travel speed whereby an unstable saw blade/rear wheels support condition is less likely to occur and the operator is less likely to have to reduce the forward travel speed of the saw 1. The greater stability provided by the torsional assembly 43 also tends to maximize life of the saw blade 27 since diagonal tipping of the saw 1 is reduced. It is also less likely that the saw blade 27 will bind and stall the prime mover 21. Yet another advantage to this cooperation between the torsional assembly 43 and the operation of the saw 1 is that greater design freedom is possible for placing components at various locations on the chassis 18, because the center of gravity location is less critical in proportion to the extent to which it is effectively moved rearwardly (CG(I)) by the torsional assembly 43.

V. Alternative Embodiments

Figure 10:
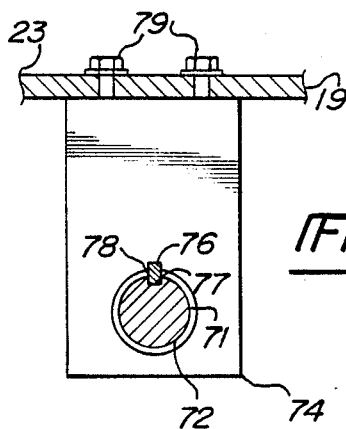
FIG. 10 is a fragmentary, vertical cross-sectional view of a slab saw suspension system comprising a first modified embodiment of the present invention.
Figure 9:
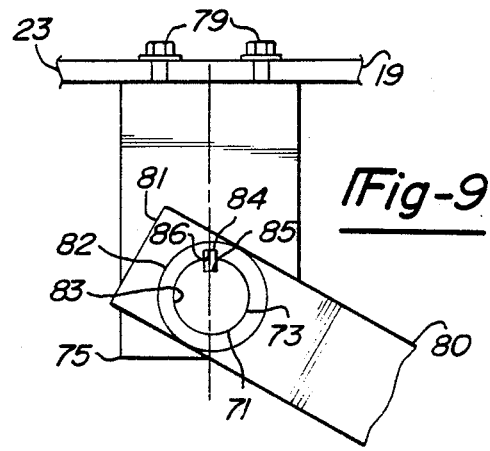
FIG. 9 is an enlarged, fragmentary, vertical cross-sectional view of the torsional assembly taken generally along line 9—9 in FIG. 7.

A slab saw 101 with a suspension system 102 comprising a first modified embodiment of the present invention is shown in FIG. 10. A modified torsional assembly 143 is shown therein with a torsional coil spring 145 having a first end 146 attached to a frame 119 below a deck 123 thereof. The coil spring 145 includes a second end 147 attached to a side arm 156 of a front axle subframe 155. The torsional coil spring 145 biases a front axle assembly 141 downwardly whereby front wheels 154 are loaded under various operating conditions of the saw 101. The slab saw 101 includes a saw blade 127 shown in phantom lines in FIG. 10 and positioned in front of the front axle assembly 141.

A slab saw 201 including a suspension system 202 comprising a second modified embodiment of the present invention is shown in FIG. 11. The suspension system 202 includes a front axle assembly 241 with a front axle subframe 255. A helical coil spring 234 includes an upper end 235 engaging a slab saw frame 219 and a lower end 236 engaging the front axle subframe 255. The slab saw 201 includes a saw blade 227 shown in phantom lines in FIG. 11 and positioned in front of the front axle assembly 241.

A slab saw 301 including a suspension system 302 comprising a third modified embodiment of the present invention is shown in FIG. 12. The suspension system 302 includes a fluid accumulator 334 connected to a fluid pump 335 adapted for pressurizing a piston-and-cylinder unit 367 to bias a front axle assembly 341 downwardly in response to a condition of instability. The slab saw 301 includes a saw blade 327 shown in phantom lines in FIG. 12 and positioned in front of the front axle assembly 341.

A slab saw 401 including a suspension system 402 comprising a fourth modified embodiment of the present invention is shown in FIG. 13. A stabilizing wheel assembly 434 is mounted on a chassis frame 419 in front of a front axle assembly 441. The stabilizing wheel assembly 434 includes a helical spring 435 for biasing a stabilizing wheel 436 downwardly. The slab saw 401 includes a saw blade 427 shown in phantom lines in FIG. 13 and positioned in front of the front axle assembly 441.

A slab saw 501 including a suspension system 502 comprising a fifth modified embodiment of the present invention is shown in FIG. 14 and includes a stabilizing wheel assembly 534 mounted on a frame 519 in front of a front axle assembly 541. The wheel assembly 534 includes a stabilizing wheel 535 mounted on a piston-and-cylinder unit 536 which is pressurized by a pressurized fluid source including a fluid accumulator 537 connected to a fluid pump 538 to extend or retract the wheel 535. The slab saw 501 includes a saw blade 527 shown in phantom lines in FIG. 14 and positioned in front of the front axle assembly 541.

The suspension systems 102, 202, 302, 402, and 502 comprising modified embodiments of the present invention function in a manner substantially similar to the suspension system 2 to stabilize the respective slab saws.

It is to be understood that while certain forms of the present invention have been illustrated and described herein, it is not to be limited to the specific forms or arrangement of parts described and shown.

I claim:

1. In combination with a machine movable on a horizontal surface including front and back ends, opposite sides, a frame mounting a prime mover, a rear axle associated with the back end and mounting a pair of rear wheels, a transverse rocker bar pivotably mounted on the frame in front of the rear axle, a front axle subframe rigidly attached to the rocker bar and extending forwardly therefrom, a transverse front axle rigidly attached to the front axle subframe and mounting a pair of front wheels, an actuating assembly adapted for extending and retracting the front axle by rotating the rocker bar whereby the machine is raised and lowered, said machine being supported by said front and rear wheels when said machine is in a fully raised position, a transverse arbor shaft fixed to the machine front end and drivingly connected to the prime mover, and a rotating tool mounted on the arbor shaft proximate one of its ends, said tool being brought into engagement with said horizontal surface for performing work when said machine is lowered, said machine at times during operation being placed in a condition of instability resulting from said tool lifting the front end of said machine and thereby taking a load off said front wheels and tending to tilt toward the side opposite said tool, the improvement of:

stabilizing means independent of said actuating assembly and located on said side opposite said tool for effectively transferring a portion of the weight of said machine towards the tool side of said machine to counter any lifting of the machine by said tool, said stabilizing means including:

(a) supplemental support means adapted for supporting said machine on said horizontal surface between said rear axle and said arbor shaft; and
(b) biasing means for selectively biasing said supplemental support means downwardly against said horizontal surface in response to a lowered condition of said machine.

2. The combination according to claim 1 wherein said machine includes a front axle assembly of said rocker bar, said front axle subframe and said front axle, and said biasing means includes spring means adapted for engaging said frame and said front axle assembly for selectively biasing said front axle assembly downwardly against the horizontal surface.

3. The combination according to claim 2 wherein:
(a) said spring means comprises a torsional assembly including a torsion bar mounted on one of said frame and said front axle assembly and a torsion arm mounted on said torsion bar, said torsion arm being adapted to selectively engage the other of said frame and said front axle assembly.

4. The combination according to claim 3 wherein:
(a) said torsion bar includes a first end fixedly connected to said frame and a second end pivotally connected to said frame.

5. The combination according to claim 4 wherein:
(a) said torsion arm includes a proximate end fixedly connected to said torsion bar in proximity to said torsion bar second end and a distal end adapted for selectively engaging said front axle.

6. The combination according to claim 5 wherein:
(a) said rotating tool is mounted on a first end of said arbor shaft at a first side of said machine; and
(b) said torsion bar second end is positioned in proximity to a second side of said machine.

7. The combination according to claim 2 wherein said biasing means comprises:
(a) a helical coil spring receiving said rocker bar and adapted to bias said front axle assembly downwardly.

8. The combination according to claim 7 wherein:
(a) said helical coil spring includes a first end connected to said frame and a second end connected to said front axle subframe.

9. The combination according to claim 2 wherein said biasing means comprises:
(a) a helical coil spring having a first end engaging said frame and a second end engaging said front axle subframe, said helical coil spring being adapted to bias said front axle assembly downwardly.

10. The combination according to claim 1 wherein said biasing means comprises:
(a) a fluid-actuated piston-and-cylinder unit connected to said rocker bar and adapted to rotate said rocker bar whereby said front axle is lowered; and
(b) a fluid pressure source connected to said piston-and-cylinder unit.

11. The combination according to claim 1 wherein:
(a) said supplemental support means comprises a support wheel assembly reciprocably mounted on said frame.

12. The combination according to claim 11 wherein said biasing means comprises:
(a) a spring engaging said frame and said wheel assembly.

13. The combination according to claim 11 wherein said biasing means comprises:

(a) a piston-and-cylinder unit connected to said frame and said wheel assembly; and
(b) a fluid pressure source connected to said piston-and-cylinder unit.

14. The combination according to claim 1 wherein said machine includes:
(a) a longitudinal centerline;
(b) a center of gravity movable along a center of gravity line as said machine moves between its raised and lowered positions; and
(c) said center of gravity line extending in parallel, spaced relation with respect to said machine centerline and being positioned between said machine centerline and said tool.

15. In combination with a machine movable on a horizontal surface and having a tool for working a material associated with said horizontal surface and a frame, the improvement of a suspension system which comprises:
means for raising and lowering said machine with respect to said horizontal surface;
support means connected to said frame and for supporting said machine on said horizontal surface;
said support means being associated with said means for raising and lowering said machine and comprising an extendable and retractable axle assembly;
said axle assembly including a transverse rocker bar pivotably mounted on said frame; and an axle subframe interconnecting said rocker bar and said axle;
biasing means associated with said support means; and
said biasing means including spring means for engaging said frame and said axle assembly for selectively biasing said axle assembly downwardly against the horizontal surface in response to a lowered condition of said machine.

16. The suspension system according to claim 15 wherein:
(a) said spring means comprises a torsional assembly including a torsion bar mounted on one of said frame and said axle assembly and a torsion arm mounted on said torsion bar, said torsion arm being adapted to selectively engage the other of said frame and said axle assembly.

17. The suspension system according to claim 16 wherein:
(a) said torsion bar includes a first end fixedly connected to said frame and a second end pivotally connected to said frame.

18. The suspension system according to claim 17 wherein:
(a) said torsion arm includes a proximate end fixedly connected to said torsion bar in proximity to said torsion bar second end and a distal end adapted for selectively engaging said axle.

19. The suspension system according to claim 15 wherein said spring means comprises:
(a) a helical coil spring receiving said rocker bar and adapted to bias said axle assembly downwardly.

20. The suspension system according to claim 19 wherein:
(a) said helical coil spring includes a first end connected to said frame and a second end connected to said axle subframe.

21. The suspension system according to claim 15 wherein said spring means comprises:
(a) a helical coil spring having a first end engaging said frame and a second end engaging said axle subframe, said helical coil spring being adapted to bias said axle assembly downwardly.

* * * * *